United States Patent
Choi et al.

(10) Patent No.: US 9,904,422 B2
(45) Date of Patent: Feb. 27, 2018

(54) MOTHER SUBSTRATE FOR A TOUCH SCREEN PANEL AND ARRAY TEST METHOD THEREOF

(71) Applicant: Samsung Display Co., LTD., Yongin, Gyeonggi-Do (KR)

(72) Inventors: Byoung-Won Choi, Ansan-si (KR); Seong-Mo Hwang, Seongnam-si (KR); Seung-Ho Nam, Seongnam-si (KR); Soo-Guy Rho, Suwon-si (KR); Jong-Won Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 90 days.

(21) Appl. No.: 14/677,325

(22) Filed: Apr. 2, 2015

(65) Prior Publication Data
US 2016/0062536 A1    Mar. 3, 2016

(30) Foreign Application Priority Data

Sep. 2, 2014  (KR) .......................... 10-2014-0116338

(51) Int. Cl.
*G06F 3/041*    (2006.01)
*G06F 3/044*    (2006.01)

(52) U.S. Cl.
CPC .... *G06F 3/044* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

| | | | | |
|---|---|---|---|---|
| 2008/0137016 A1* | 6/2008 | Kim | .................... | G02F 1/13452 349/139 |
| 2011/0260741 A1* | 10/2011 | Weaver | ................. | G06F 3/0418 324/686 |
| 2012/0319623 A1* | 12/2012 | Cheng | ................. | G02F 1/13452 315/312 |
| 2013/0300678 A1* | 11/2013 | Kang | ..................... | G06F 3/044 345/173 |
| 2014/0015563 A1* | 1/2014 | Kao | ......................... | H01H 1/06 324/763.01 |
| 2014/0062909 A1* | 3/2014 | Choi | ........................ | G09G 3/32 345/173 |
| 2014/0291846 A1* | 10/2014 | Chai | ..................... | G02F 1/1345 257/749 |

(Continued)

FOREIGN PATENT DOCUMENTS

| | | |
|---|---|---|
| JP | 2010-276541 | 12/2010 |
| JP | 2011-064705 | 3/2011 |

(Continued)

*Primary Examiner* — Andrew Sasinowski
*Assistant Examiner* — Henok Heyi
(74) *Attorney, Agent, or Firm* — Innovation Counsel LLP

(57) ABSTRACT

A mother substrate for touch screen panel includes a plurality of sensing patterns disposed in an active area, a plurality of first pads disposed in an non-active area surrounding the active area, a plurality of position detecting lines disposed in an non-active area and connecting the sensing patterns and the first pads and a plurality of second pads connected to the first pads. The first pads are spaced apart from each other by a first width. The second pads are spaced apart from each other by a second width more than the first width.

20 Claims, 7 Drawing Sheets

(56) References Cited

U.S. PATENT DOCUMENTS

| | | | |
|---|---|---|---|
| 2015/0009438 A1* | 1/2015 | Du | G02F 1/1345 349/42 |
| 2015/0170575 A1* | 6/2015 | Kwak | G06F 3/047 345/174 |
| 2015/0216054 A1* | 7/2015 | Standing | B23K 1/0016 361/761 |
| 2015/0253898 A1* | 9/2015 | Kim | G06F 3/044 345/174 |

FOREIGN PATENT DOCUMENTS

| | | |
|---|---|---|
| KR | 10-2007-0017788 | 2/2007 |
| KR | 10-2009-0094534 | 9/2009 |
| KR | 10-2013-0050458 | 5/2013 |
| KR | 10-2013-0078578 | 7/2013 |
| KR | 10-2013-0106732 | 9/2013 |
| KR | 10-1380375 | 4/2014 |

* cited by examiner

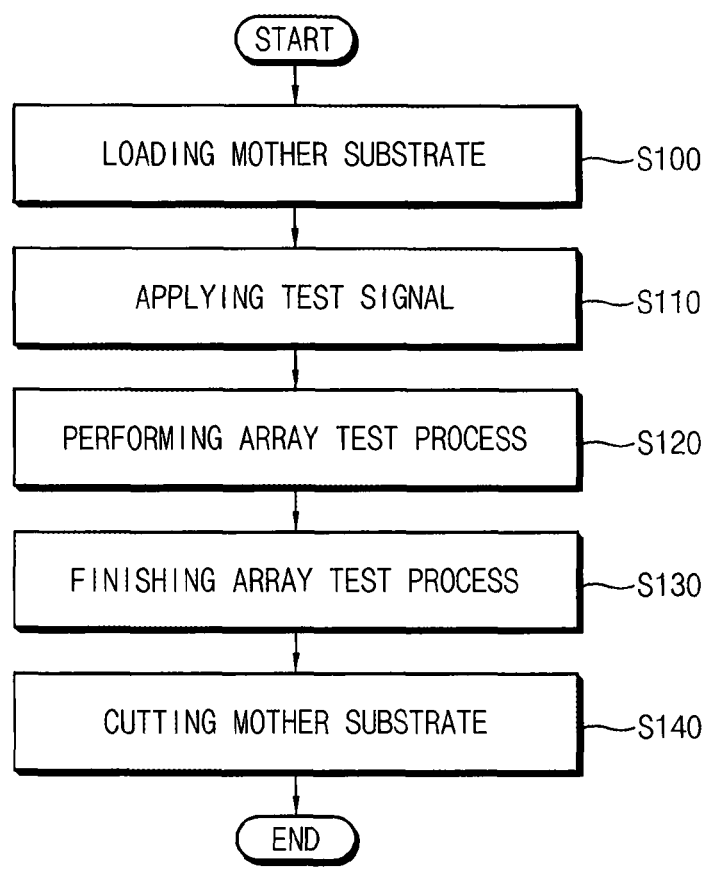

MOTHER SUBSTRATE FOR A TOUCH SCREEN PANEL AND ARRAY TEST METHOD THEREOF

CROSS-REFERENCE TO RELATED APPLICATIONS

This application claims priority under 35 U.S.C. § 119 to Korean Patent Application No. 10-2014-0116338, filed on Sep. 2, 2014 in the Korean Intellectual Property Office KIPO, the contents of which are herein incorporated by reference in their entireties.

BACKGROUND

1. Field

Exemplary embodiments of the present inventive concept relate to a mother substrate for touch screen panel and array test method of the mother substrate for touch screen panel.

2. Description of the Related Art

As demands on various type of display devices have recently increased with the development of an information society, studies on display devices, such as a liquid crystal display device (LCD), a plasma display panel (PDP), a field emission display device (FED), and electrophoretic display device (EPD) and an organic light emitting display device (OLED), have been actively conducted.

Recently, studies have been conducted to apply a touch screen panel function to such display devices. A touch screen panel is an input device which enables a command to be inputted by touching a screen of a display device using an object, such as a finger or pen. Since such a touch screen panel can be substituted for a separate input device connected to a display device, such as a keyboard or mouse, its application fields have been gradually extended.

Touch screen panels are divided into a resistive overlay touch screen panel, a photosensitive touch screen panel, a capacitive touch screen panel, and the like. Among these touch screen panels, the capacitive touch screen panel converts information of a contact position into an electrical signal by sensing a change in the capacitance formed between a conductive sensing pattern and an adjacent sensing pattern, ground electrode or the like when an object, such as a user's hand or pen, comes in contact with the touch screen panel.

Recently, a size of a panel has been increased and a size of bezel has been decreased in a touch screen panel. In addition, the number of touch pad connected to detecting electrode has been increased, so that the pitch of the touch pads becomes smaller. Therefore, a test method of the densely arranged touch pads may be needed.

SUMMARY

Exemplary embodiments of the present inventive concept provide a touch screen panel and a mother substrate for touch screen panel capable of testing for touch screen panel.

Exemplary embodiments of the present inventive concept further provide an array test method of the touch screen panel and the mother substrate for touch screen panel.

In an exemplary embodiment of a mother substrate for touch screen panel according to the present inventive concept, the mother substrate for touch screen panel includes a plurality of sensing patterns disposed in an active area, a plurality of first pads disposed in an non-active area surrounding the active area, a plurality of position detecting lines disposed in the non-active area and connecting the sensing patterns and the first pads and a plurality of second pads connected to the first pads. The first pads are spaced apart from each other by a first width. The second pads are spaced apart from each other by a second width more than the first width.

In an exemplary embodiment, the mother substrate for touch screen panel may further include a plurality of connection lines disposed in the non-active area and connecting the first pads and the second pads.

In an exemplary embodiment, each of the connection lines may include a first end connected to one of the first pads and a second end connected to one of the second pads. The connection lines have fan-out portion.

In an exemplary embodiment, the non-active area may be divided into two areas by a cutting line surrounding the active area. The non-active area may include a touch screen panel area disposed inside of the cutting line and a peripheral area disposed outside of the cutting line.

In an exemplary embodiment, the first pads and the position detecting lines may be disposed in the touch screen panel area.

In an exemplary embodiment, the second pads and the connection lines may be disposed in the peripheral area.

In an exemplary embodiment, the first width may be less than about 100 um.

In an exemplary embodiment, the second width may be more than about 180 um.

In an exemplary embodiment, the first pads and the second pads may be formed of the same material.

In an exemplary embodiment of a touch screen panel according to the present inventive concept, the touch screen panel includes a plurality of sensing patterns disposed in an active area, a plurality of first pads disposed in an non-active area surrounding the active area, the first pads being spaced apart from each other by a first width, a plurality of position detecting lines disposed in the non-active area and connecting the sensing patterns and the first pads. The touch screen panel has an exposed portion of a first pad forming material on a cutting plane.

A distance between the exposed portions of a first pad forming material is larger than the first width.

The touch screen panel further includes a fanout portion connected to the plurality of first pads and extending toward the cutting plane.

A distance between exposed portions of a first pad forming material in a center is greater than a distance between exposed portions of a first pad forming material in an edge.

In an exemplary embodiment of an method of forming a touch screen panel which comprises a plurality of sensing patterns disposed in an active area, a plurality of first pads disposed in an non-active area surrounding the active area, a plurality of position detecting lines disposed in the non-active area and configured to connect the sensing patterns and the first pads and a plurality of second pads connected to the plurality of first pads the first pads, the array test method includes applying a test signal to the sensing patterns, detecting the test signal from the second pads and cutting the mother substrate for touch screen panel along a cutting line formed in the non-active area. The first pads are spaced apart from each other by a first width, and the second pads are spaced apart from each other by a second width more than the first width.

In an exemplary embodiment, the method may further include a plurality of connection lines disposed in the non-active area and connected between the first pads and the second pads.

In an exemplary embodiment, each of the connection lines may include a first end connected to one of the first pads and a second end connected to one of the second pads. A distance between two adjacent second ends may be more than a distance between two adjacent first ends.

In an exemplary embodiment, the non-active area may be divided as two areas by a cutting line surrounding the active area. The non-active area may include a touch screen panel area disposed inside of the cutting line and a peripheral area disposed outside of the cutting line.

In an exemplary embodiment, the first pads and the position detecting lines may be disposed in the touch screen panel area.

In an exemplary embodiment, the second pads and the connection lines may be disposed in the peripheral area.

In an exemplary embodiment, the first width may be less than about 100 um.

In an exemplary embodiment, the second width may be more than about 180 um.

In an exemplary embodiment, the first pads and the second pads may be formed of the same material.

According to the present exemplary embodiment, a mother substrate for touch screen panel includes first pads arranged densely and second pads extended from the first pads. A width between the first pads is less than 100 um. A width between the second pads is more than 180 um. When a width between the pads is less than 180 um, an array test is impossible. However, a width between the second pads is more than 180 um. Therefore, an array test through the second pads may be possible.

In addition, the second pads are removed after the array test is finished. Therefore, loss of a space of the touch screen panel may be decreased.

BRIEF DESCRIPTION OF THE DRAWINGS

The above and other features and advantages of the present inventive concept will become more apparent by describing in detailed exemplary embodiments thereof with reference to the accompanying drawings, in which:

FIG. 10 is a flowchart illustrating an array test method of the mother substrate for touch screen panel according to an exemplary embodiment of the present inventive concept.

DETAILED DESCRIPTION OF THE INVENTIVE CONCEPT

Hereinafter, the present inventive concept will be explained in detail with reference to the accompanying drawings.

Figure 1:
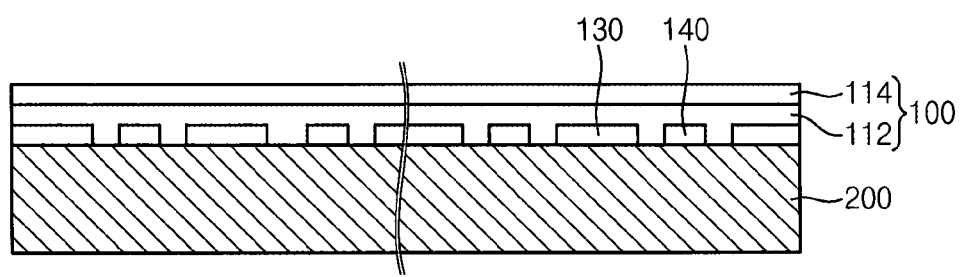
FIG. 1 is a cross-sectional view of a display device having a touch screen panel according to an exemplary embodiment of the present inventive concept.
Figure 2:
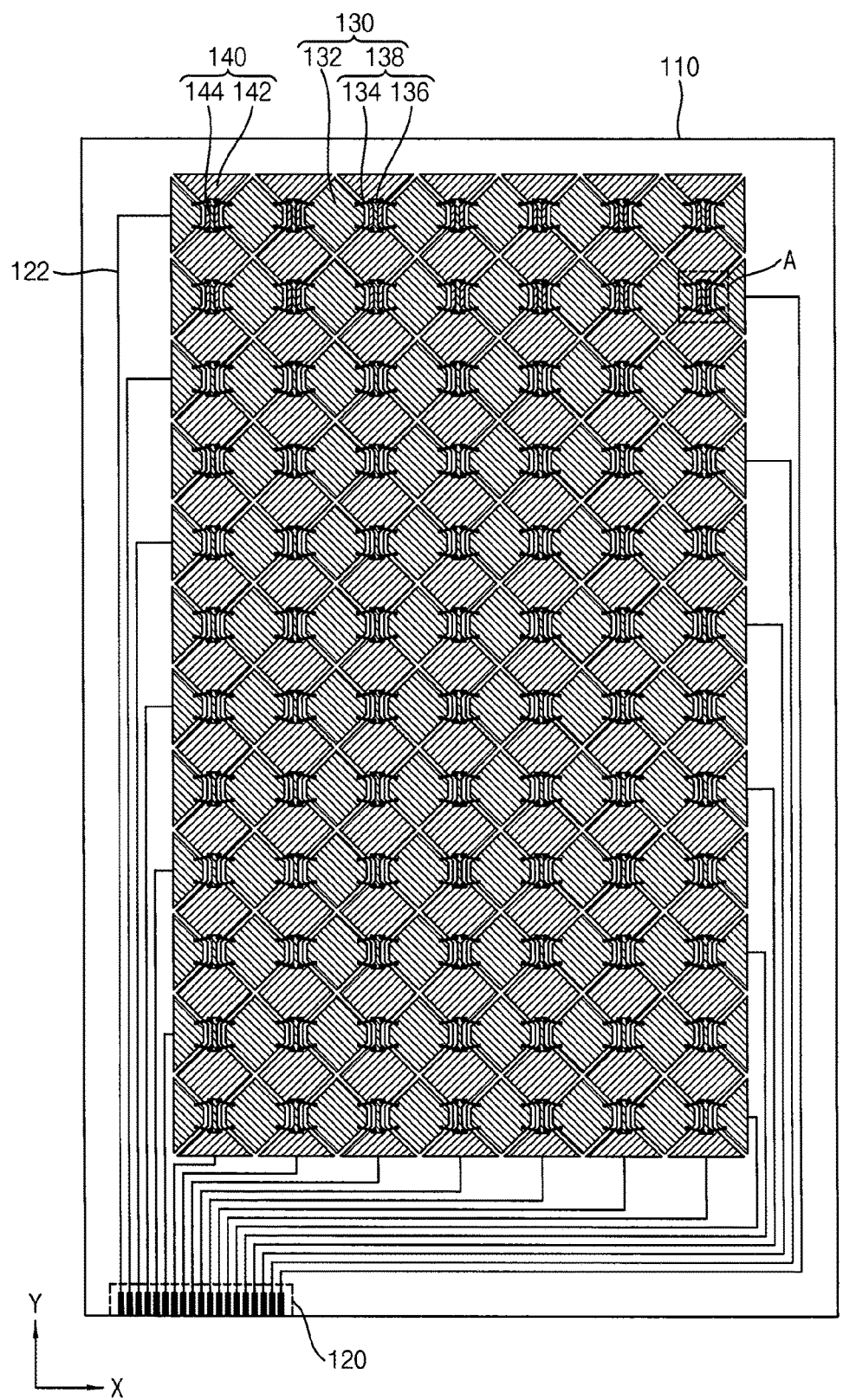
FIG. 2 is a plan view illustrating touch screen panel according to an exemplary embodiment of the present inventive concept.
Figure 3:
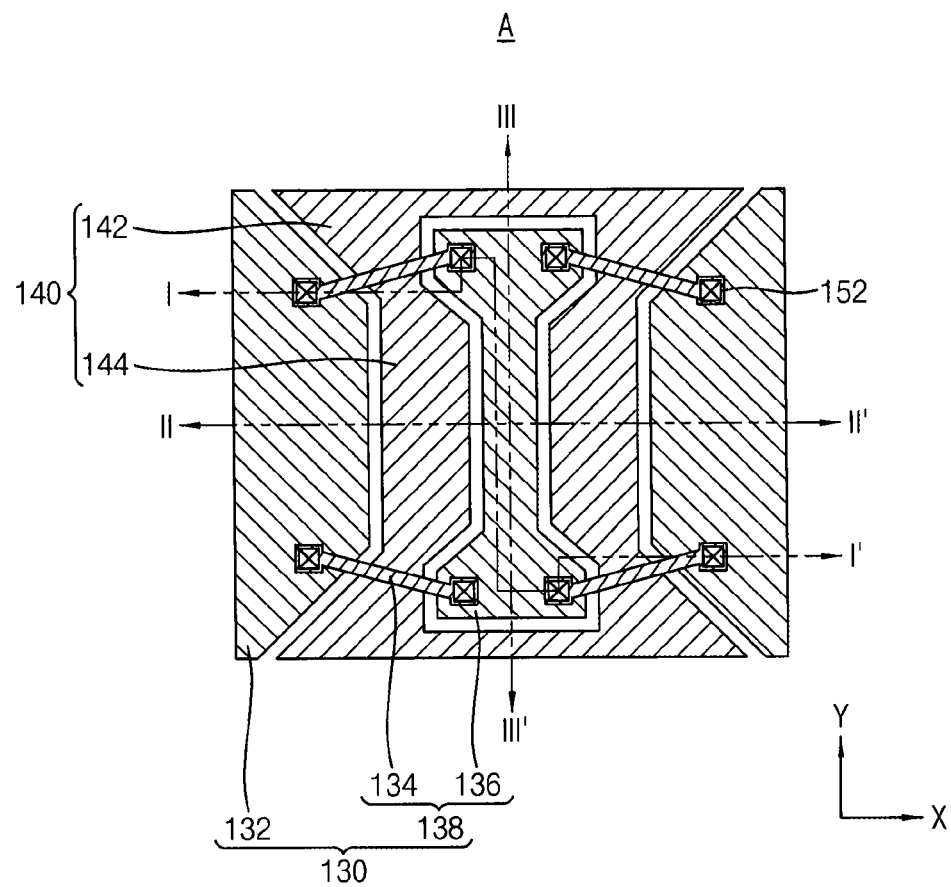
FIG. 3 is a main part enlarged view showing an embodiment of sensing cells and connection patterns at portion A shown in FIG. 2.

FIG. 1 is a cross-sectional view of a display device having a touch screen panel according to an exemplary embodiment of the present inventive concept. FIG. 2 is a plan view illustrating touch screen panel according to an exemplary embodiment of the present inventive concept. FIG. 3 is a main part enlarged view showing an embodiment of sensing cells and connection patterns at portion A shown in FIG. 2.

Referring to FIG. 1, a display device having a touch screen panel includes a touch screen panel 100 to which a command is inputted at a contact position and a display panel 200 for displaying an image based on the command inputted to the touch screen panel 100.

Referring to FIGS. 2 and 3, a touch screen panel 100 according to a first embodiment of the present inventive concept includes a transparent substrate 110, sensing patterns 130 and 140 formed in an active area on the transparent substrate 110, and position detecting lines 122 formed in a non-active area outside the active area.

The transparent substrate 110 may be an upper substrate which constitutes the display panel 200 of FIG. 1 in the display device. Alternatively, the transparent substrate 110 may be a separate substrate attached to the display panel 200.

The sensing patterns 130 and 140 are alternately arranged, and include first sensing patterns 130 connected to one another to form a row having the same X coordinate, and second sensing patterns 140 connected to one another to form a column having the same Y coordinate. The touch screen panel 100 may be a capacitive touch screen panel in which the first sensing patterns 130 and the second sensing patterns 140 are alternately distributed and arranged in the active area.

The first sensing patterns 130 include first sensing cells 132 which are arranged along a first direction (column direction) in the active area, and a first connection pattern 138 which connects the first sensing cells 132 to each other.

The first sensing cells 132 are made of a transparent conductive material having a predetermined transmittance so that light from the display panel 200 (disposed beneath the touch screen panel 100 of FIG. 1) can be transmitted to display images from the display panel 200. Indium tin oxide (ITO) or indium zinc oxide (IZO) may be used as the transparent conductive material.

In order to serve as sensing electrodes of the touch screen panel 100, the first sensing cells 132 of FIG. 2 arranged along the first direction are necessarily electrically connected to each other. Accordingly, the first sensing cells 132 are electrically connected to each other by the first connection pattern 138.

The first connection pattern 138 electrically connects the first sensing cells 132 along the second direction. The first connection pattern 138 may include two pairs of metal patterns 134 and a transparent pattern 136 through which the two pairs of metal patterns 134 are electrically connected to one another.

The two pairs of metal patterns 134 are arranged so as to respectively overlap a connecting portion of the second sensing pattern 140 while being spaced apart from one another. In this instance, the metal patterns 134 are designed to be inclined at a predetermined angle with respect to an X-direction. The inclined metal patterns 134 are less perceivable than the metal patterns having a horizontal or vertical direction by human eyes so that visibility is improved.

In this embodiment, the first connection pattern 138 which connects the first sensing cells 132 to each other have two pairs of metal patterns 134 arranged so as to be spaced apart from one another so that, although one metal pattern is disconnected due to static electricity, an electrical signal can be supplied to remaining metal pattern, thereby ensuring the stability of the first connection pattern 138. As such, in this embodiment, the problem of electrostatic discharge (ESD) can be solved by adopting multiple metal patterns 134.

The metal patterns 134 are formed of a low-resistance metallic material. The metallic material used for the metal patterns 134 may include a low-resistance metallic material such as molybdenum (Mo), silver (Ag), titanium (Ti), copper (Cu), aluminum (Al) or molybdenum/aluminum/molybdenum (Mo/Al/Mo).

The metal patterns 134 may be formed of the same material as the metallic material used for the position detecting lines 122 formed in the non-active area of the touch screen panel 100. In this case, since the metal patterns 134 are formed on the same layer through the same process as the position detecting lines 122, an additional mask process for forming the pair of metal patterns 134 can be eliminated, so that it is possible to reduce the number of processes and time for manufacture.

Although the metal patterns 134 may be formed in the shape of a rectangular bar, as shown as shown in FIG. 3, this is merely one embodiment, and the present inventive concept is not limited thereto.

The metal patterns 134 that are spaced apart from one another are electrically connected to both edges of the transparent pattern 136, thus the metal patterns 134 are electrically connected to one another. That is, one end of the metal pattern 134 is electrically connected to the first sensing cell 132, and the other end of the metal pattern 134 is electrically connected to the transparent pattern 136. An adjacent first sensing cell has the metal patterns 134 which connect the adjacent first sensing cell to the transparent pattern 136 so that adjacent first sensing cells 132 are electrically connected to each other.

The transparent pattern 136 is an island pattern which is enclosed with and spaced apart from the second sensing pattern 140

The transparent pattern 136 is made of a transparent conductive material, and upper left, lower left, upper right and lower right edges of the transparent pattern 136 are respectively electrically connected to the metal patterns 134. ITO or IZO may be used as the transparent conductive material of the transparent pattern 136.

The transparent pattern 136 may be formed of the same material as the first sensing cells 132 and/or the second sensing pattern 140. In this case, since the transparent pattern 136 is formed on the same layer through the same process as the first sensing cells 132 and/or the second sensing pattern 140, an additional mask process for forming the transparent pattern 136 can be eliminated, so that it is possible to reduce the number of processes and time for manufacture.

The transparent pattern 136 may be formed in the shape of an English alphabet 'I'. However, this is merely one embodiment and the present inventive concept is not limited thereto.

As described above, the first sensing cells 132 are connected to each other by the two pairs of metal patterns 134 made of a low-resistance metallic material, so that the flow of charge can be promoted at the connection portions between the first sensing cells 132, thereby increasing the sensitivity of the first sensing cells 132.

Furthermore, in this embodiment, by implementing the transparent pattern 136 between the adjacent first sensing cells, the visibility of the display can be improved by minimizing the area of the metallic material as compared to a case in which no transparent pattern 136 is implemented.

The second sensing patterns 140 include second sensing cells 142 which are spaced apart from the first sensing cells 132 along a first direction (column direction) in the active area, and a second connection pattern 144 which connects the second sensing cells 142 to each other.

The second sensing cells 142 are made of a transparent conductive material having a predetermined transmittance so that light from the display panel 200 (disposed beneath the touch screen panel 100 in FIG. 1) can be transmitted to display images from the display panel 200. ITO or IZO may be used as the transparent conductive material. The second sensing cells 142 may be formed of the same material on the same layer as the first sensing cells 132.

In order to serve as sensing electrodes of the touch screen panel 100, the second sensing cells 142, arranged along the first direction, are necessarily electrically connected to each other. Accordingly, the second sensing cells 142 are electrically connected to each other by the second connection pattern 144.

The second connection pattern 144 electrically connects the second sensing cells 142 to each other along the first direction. The second connection pattern 144 is made of a transparent conductive material so as to improve the visibility of the touch screen panel 100. ITO or IZO may be used as the transparent conductive material. In this instance, the second connection pattern 144 may be integrally formed with the second sensing cell 142. The second connection pattern 144 may be made of the same material as the second sensing cell 142. The second connection pattern 144 may be made using the same mask and process as the second sensing cell 142.

The second connection pattern 144 formed on the same layer as the transparent pattern 136 is disposed so as to be diverged from the second sensing cell 142 to both sides of the transparent pattern 136 with the transparent pattern 136 interposed therebetween. In this instance, the diverged second connection pattern 144 is disposed so as to be spaced apart from the transparent pattern 136. Thus, the second sensing pattern 140 surrounds the transparent pattern 136.

Figure 4:
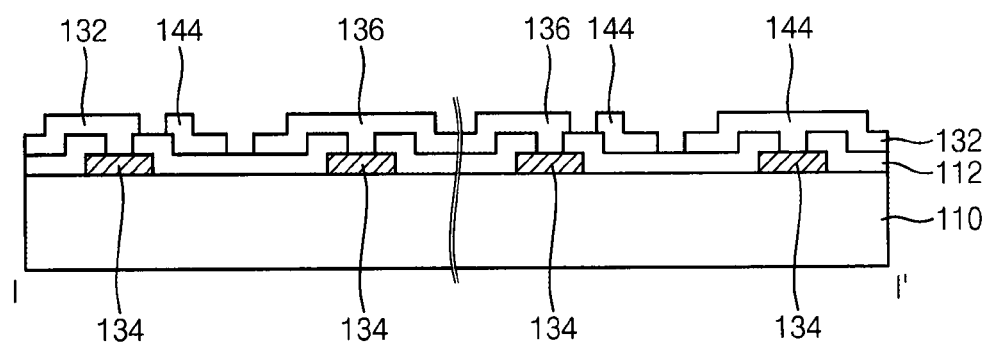
FIG. 4 is a cross-sectional view taken along a line I-I' of FIG. 3.
Figure 5:
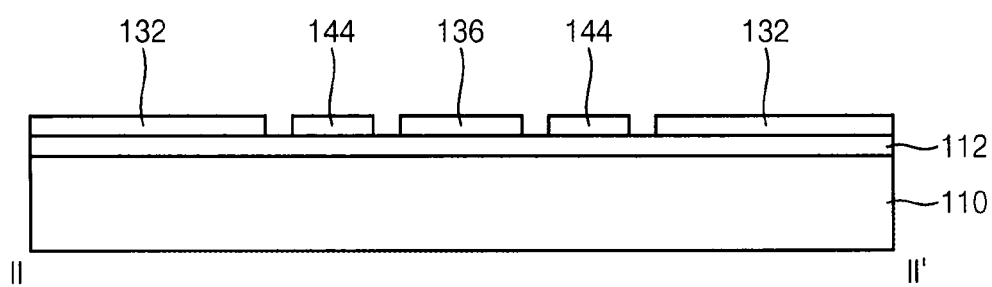
FIG. 5 is a cross-sectional view taken along a line II-II' of FIG. 3.
Figure 6:
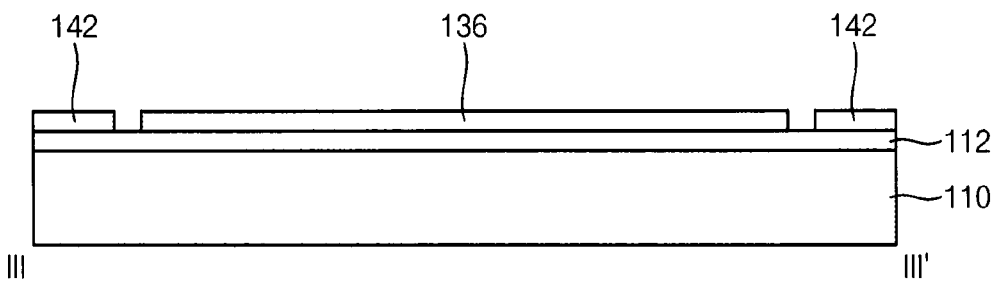
FIG. 6 is a cross-sectional view taken along a line III-III' of FIG. 3.

FIG. 4 is a cross-sectional view taken along a line I-I' of FIG. 3. FIG. 5 is a cross-sectional view taken along a line II-II' of FIG. 3. FIG. 6 is a cross-sectional view taken along a line III-III' of FIG. 3.

Referring to FIGS. 4 to 6, two pairs of metal patterns 134 are formed on the transparent substrate 110, and an insulating layer 112 is formed on the transparent substrate 110 including the two pairs of metal patterns 134.

Contact holes 152 for respectively exposing both ends of each of the two pairs of metal patterns 134 are formed in the insulating layer 112. The first sensing cells 132 are connected to one end of the metal patterns 134 exposed through the contact holes 152 so that the first sensing cells 132 and the metal patterns 134 are electrically connected to each other.

The transparent pattern 136 is connected to the other end of the metal patterns 134 exposed through the contact holes 152 so that the metal patterns 134 and the transparent pattern 136 are electrically connected to each other. An adjacent first sensing cell 132 is electrically connected to the transparent pattern 136 using metal patterns. Thus, adjacent first sensing cells are connected to each other through the metal patterns 134 and the transparent pattern 136.

Meanwhile, one or more contact holes 152, particularly, two or more contact holes 152, may be formed to expose one end or the other end of the metal pattern 134, so that contact resistance can be decreased. The number of contact holes 152 may be controlled in consideration of contact resistance, visibility, and the like.

The second connection pattern 144 is formed to overlap the metal patterns 134, with the insulating layer 112 interposed therebetween and electrically connecting adjacent second sensing cells 142. The second connection pattern 144 may be integrally formed with the second sensing cell 142. The second connection pattern 144 is formed on the same layer as the transparent pattern 136, but the second connection pattern 144 and the transparent pattern 136 are formed so as to be spaced apart from each other as described above.

Referring back to FIG. 2, the position detecting lines 122 are arranged in the non-active area of the touch screen panel 100, which is formed outside the active area for displaying an image. The position detecting lines 122 supply a signal sensed by the sensing patterns 130 and 140 to an external driving circuit (not shown) through a pad portion 120.

In this instance, the first sensing patterns 130, connected to one another along the second direction, are electrically connected to the respective position detecting lines 122. The second sensing patterns 140, connected to one another along the first direction, are electrically connected to the respective position detecting lines 122.

The position detecting line 122 may be formed of a low-resistance metallic material or transparent electrode material, such as Mo, Ag, Ti, Cu, Al or Mo/Al/Mo.

As described above, the touch screen panel 100 is a capacitive touch screen panel. If the touch screen panel 100 is contacted by a contact object, such as a user's finger or stylus pen, a change in capacitance, caused by a contact, is provided to the external driving circuit (not shown) through the position detecting lines 122 and the pad portion 120. Then, the change in capacitance is converted into an electrical signal by an X and Y input processing circuit (not shown) or the like, so that the contact position is detected.

Meanwhile, in this embodiment, the first and second sensing cells 132 and 142, respectively, are not necessarily positioned on the same layer. For example, the first and second sensing cells 132 and 142, respectively, may be alternatively disposed on different layers from each other. A protection layer 114 may be formed on the sensing patterns 130 and 140 so as to protect the sensing patterns 130 and 140 formed thereunder. The insulating layer 112 and the protection layer 114 may be formed of a transparent insulating material such as silicon oxide ($SiO_2$).

Figure 7:
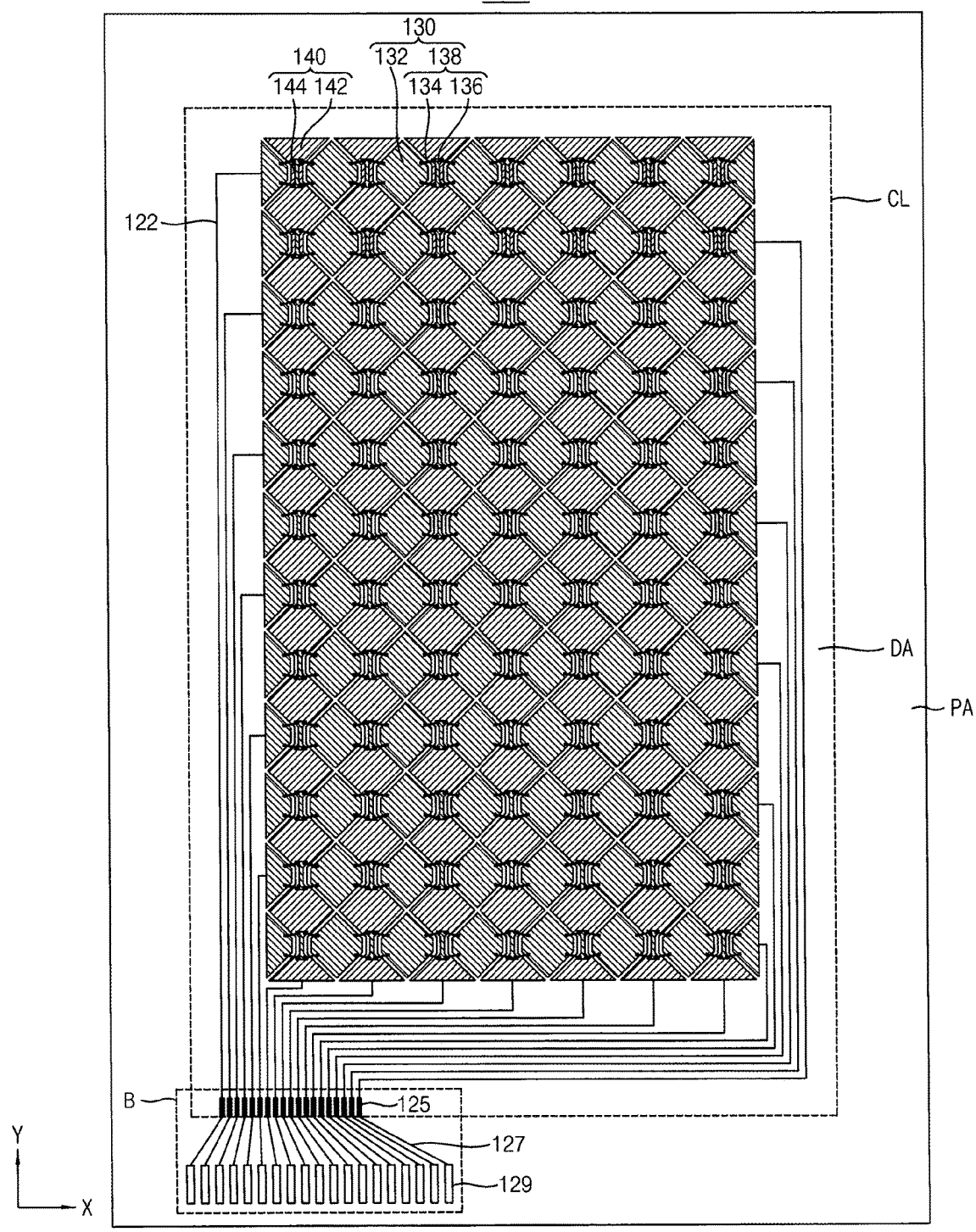
FIG. 7 is a plan view illustrating mother substrate for touch screen panel according to an exemplary embodiment of the present inventive concept.
Figure 8:
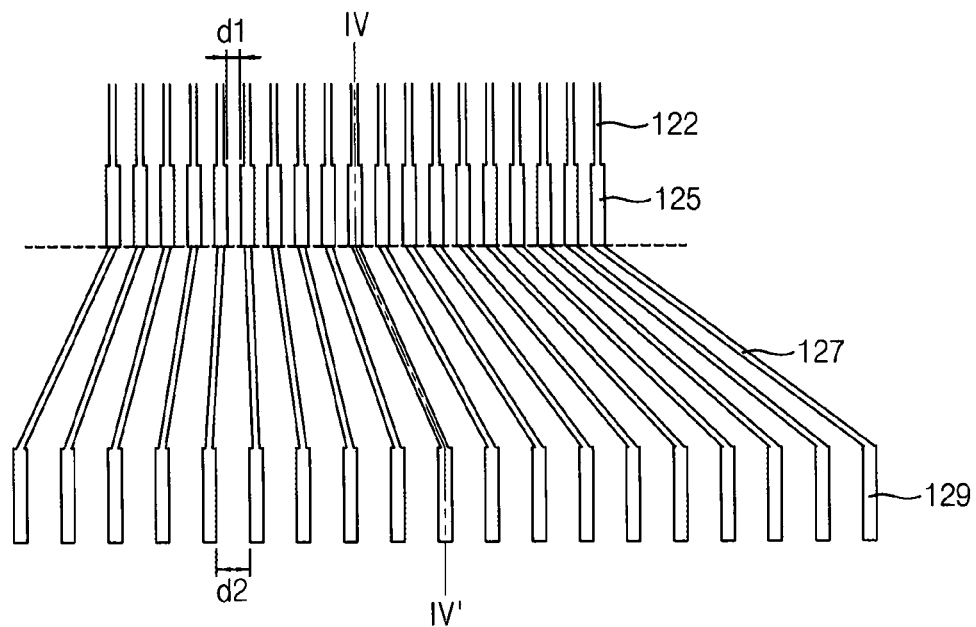
FIG. 8 is an enlarged view of portion B shown in FIG. 7.
Figure 9:
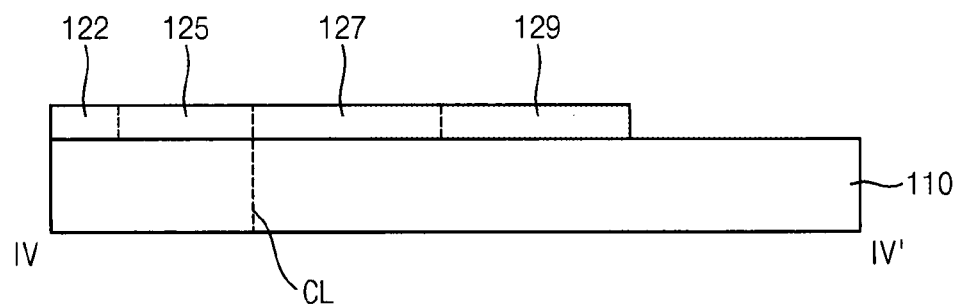
FIG. 9 is a cross-sectional view taken along a line IV-IV' of FIG. 8.

FIG. 7 is a plan view illustrating a mother substrate for touch screen panel according to an exemplary embodiment of the present inventive concept. FIG. 8 is an enlarged view of portion B shown in FIG. 7. FIG. 9 is a cross-sectional view taken along a line IV-IV' of FIG. 8.

Referring to FIGS. 7 to 9, a mother substrate 1000 for touch screen panel 100 according to a first embodiment of the present inventive concept includes a transparent substrate 110, sensing patterns 130 and 140 formed in an active area on the transparent substrate 110, and position detecting lines 122 formed in a non-active area outside the active area.

The transparent substrate 110 may be an upper substrate which constitutes the display panel 200 of FIG. 1 in the display device. Alternatively, the transparent substrate 110 may be a separate substrate attached to the display panel 200.

The sensing patterns 130 and 140 are alternately arranged, and include first sensing patterns 130 connected to one another to form a row having the same X coordinate, and second sensing patterns 140 connected to one another to form a column having the same Y coordinate. The touch screen panel 100 may be a capacitive touch screen panel in which the first sensing patterns 130 and the second sensing patterns 140 are alternately distributed and arranged in the active area.

The first sensing patterns 130 include first sensing cells 132 which are arranged along a first direction (column direction) in the active area, and a first connection pattern 138 which connects the first sensing cells 132 to each other.

The first sensing cells 132 are made of a transparent conductive material having a predetermined transmittance so that light from the display panel 200 can be transmitted to display images from the display panel 200. Indium tin oxide (ITO) or indium zinc oxide (IZO) may be used as the transparent conductive material.

In order to serve as sensing electrodes of the touch screen panel 100, the first sensing cells 132 of FIG. 2 arranged along the first direction are necessarily electrically connected to each other. Accordingly, the first sensing cells 132 are electrically connected to each other by the first connection pattern 138.

The first connection pattern 138 electrically connects the first sensing cells 132 along the second direction. The first connection pattern 138 may include two pairs of metal patterns 134 and a transparent pattern 136 through which the two pairs of metal patterns 134 are electrically connected to one another.

The two pairs of metal patterns 134 are arranged so as to respectively overlap a connecting portion of the second sending pattern 140 while being spaced apart from one another. In this instance, the metal patterns 134 are designed to be inclined at a predetermined angle with respect to an X-direction. The inclined metal patterns 134 are less perceivable than the metal patterns having a horizontal or vertical direction by human eyes so that visibility is improved.

The metal patterns 134 are formed of a low-resistance metallic material. The metallic material used for the metal patterns 134 may include a low-resistance metallic material such as molybdenum (Mo), silver (Ag), titanium (Ti), copper (Cu), aluminum (Al) or molybdenum/aluminum/molybdenum (Mo/Al/Mo).

The metal patterns 134 may be formed of the same material as the metallic material used for the position detecting lines 122 formed in the non-active area of the touch screen panel 100. In this case, since the metal patterns 134 are formed on the same layer through the same process as the position detecting lines 122, an additional mask process for forming the pair of metal patterns 134 can be eliminated, so that it is possible to reduce the number of processes and time for manufacture.

Although the metal patterns 134 may be formed in the shape of a rectangular bar, this is merely one embodiment, and the present inventive concept is not limited thereto.

The metal patterns 134 that are spaced apart from one another, are electrically connected to both edges of the transparent pattern 136, thus the metal patterns 134 are electrically connected to one another. That is, one end of the metal pattern 134 is electrically connected to the first sensing cell 132, and the other end of the metal pattern 134 is electrically connected to the transparent pattern 136. An adjacent first sensing cell has the metal patterns 134 which connect the adjacent first sensing cell to the transparent pattern 136 so that adjacent first sensing cells 132 are electrically connected to each other.

The transparent pattern 136 is an island pattern which is enclosed with and spaced apart from the second sensing pattern 140.

The transparent pattern 136 is made of a transparent conductive material, and upper left, lower left, upper right and lower right edges of the transparent pattern 136 are respectively electrically connected to the metal patterns 134. ITO or IZO may be used as the transparent conductive material of the transparent pattern 136.

The transparent pattern 136 may be formed of the same material as the first sensing cells 132 and/or the second sensing pattern 140. In this case, since the transparent pattern 136 is formed on the same layer through the same process as the first sensing cells 132 and/or the second sensing pattern 140, an additional mask process for forming the transparent pattern 136 can be eliminated, so that it is possible to reduce the number of processes and time for manufacture.

The transparent pattern 136 may be formed in the shape of an English alphabet 'I'. However, this is merely one embodiment and the present inventive concept is not limited thereto.

The second sensing patterns 140 include second sensing cells 142 which are spaced apart from the first sensing cells 132 along a first direction (column direction) in the active area, and a second connection pattern 144 which connects the second sensing cells 142 to each other.

The second sensing cells 142 are made of a transparent conductive material having a predetermined transmittance so that light from the display panel 200 (disposed beneath the touch screen panel 100 in FIG. 1) can be transmitted to display images from the display panel 200. ITO or IZO may be used as the transparent conductive material. The second sensing cells 142 may be formed of the same material on the same layer as the first sensing cells 132.

In order to serve as sensing electrodes of the touch screen panel 100, the second sensing cells 142, arranged along the first direction, are necessarily electrically connected to each other. Accordingly, the second sensing cells 142 are electrically connected to each other by the second connection pattern 144.

The second connection pattern 144 electrically connects the second sensing cells 142 to each other along the first direction. The second connection pattern 144 is made of a transparent conductive material so as to improve the visibility of the touch screen panel 100. ITO or IZO may be used as the transparent conductive material. In this instance, the second connection pattern 144 may be integrally formed with the second sensing cell 142. The second connection pattern 144 may be made of the same material as the second sensing cell 142. The second connection pattern 144 may be made using the same mask and process as the second sensing cell 142.

The second connection pattern 144 formed on the same layer as the transparent pattern 136 is disposed so as to be diverged from the second sensing cell 142 to both sides of the transparent pattern 136 with the transparent pattern 136 interposed therebetween. In this instance, the diverged second connection pattern 144 is disposed so as to be spaced apart from the transparent pattern 136. Thus, the second sensing pattern 140 surrounds the transparent pattern 136.

The position detecting lines 122 extends in the X-direction or in a direction parallel with the Y-direction. The position detecting lines 122 is spaced apart from an adjacent position detecting lines 122 by a predetermined distance. The position detecting lines 122 connects between the sensing patterns 130 and 140 and first pads 125. The position detecting lines 122 are arranged in the non-active area of the touch screen panel 100, which is formed outside the active area for sensing a touch, so as to supply a signal sensed by the sensing patterns 130 and 140 to an external driving circuit (not shown) through the first pads 125.

The position detecting lines 122 are formed of a low-resistance metallic material. The position detecting lines 122 may include a low-resistance metallic material such as molybdenum (Mo), silver (Ag), titanium (Ti), copper (Cu), aluminum (Al) or molybdenum/aluminum/molybdenum (Mo/Al/Mo).

The first pads 125 are electrically connected to the respective position detecting lines 122. The first pads 125 are disposed in the non-active area. A signal of change in capacitance detected by the sensing patterns 130 and 140 is transferred to the first pads 125 through the position detecting lines 122.

Each of the first pads 125 is spaced apart from an adjacent first pad by a first width d1. For example, the first width d1 may be less than 100 um.

A property test, for example open and short circuit test of the first sensing pattern 130 and the second sensing pattern 140, for the sensing patterns 130 and 140 is performed through the first pad 125. When the property test for the sensing patterns 130 and 140 is performed through the first pad 125, a test jig may be used. The property test is performed by probing tips in the test jig to the first pad 125. Therefore, in order to perform the property test, a width between the first pads 125 must be maintained to have the same width of the tips in the test jig.

In order to perform property test by using the test jig, the width between the first pads 125 must be more than 180 μm. When the width between the first pads 125 is less than 180 μm, a property test by using the test jig may be impossible.

In the present exemplary embodiment, the first pad 125 is spaced apart from an adjacent first pad 125 by 100 um. Therefore, a property test through the first pad 125 is impossible.

A plurality of second pads 129 electrically connected to the first pads 125 are disposed in the non-active area. The second pads 129 may receive the signal of change in capacitance from the first pads 125. The second pad 129 is spaced apart from adjacent second pad 129 by a second width d2 more than the first width d1. For example, the second width may be more than 180 um. The second pads 129 and the first pads 125 may be formed of the same material which is formed through the same process using the same mask.

The first pad 125 may be connected to the second pad 129 by a connection line 127. The connection line 127 may have fan-out portion which extends in a diagonal direction. The connection line 127 may include a first ends connected to the first pads 125 and a second ends connected to the second pads 129. In addition, a distance between the second ends may be more than a distance between the first ends. The connection line 127, the first pads 125 and the second pads 129 may be formed of the same layer.

The non-active area of the mother substrate 1000 for touch screen panel may be divided into two regions by a cutting line CL. The non-active area may include a touch screen panel area DA disposed inside of the cutting line and a peripheral area PA disposed outside of the cutting line.

The position detecting lines 122 may be disposed in the touch screen panel area DA. The connection lines 127 may be disposed in the peripheral area PA.

After the property test for the sensing patterns 130 and 140 is finished, the mother substrate 1000 for touch screen panel is cut along the cutting line CL. Thus, the peripheral area PA of the mother substrate 1000 for touch screen panel is removed. The touch screen panel area DA of the mother substrate 1000 for touch screen panel is remained. Accordingly, the connection line 127 and the second pads 129 disposed in the peripheral area PA are removed. The cutting line CL may be formed to cross the connection line 127. Thus, the touch screen panel may have an exposed portion of the first pads 125 or the connection line 127 on a cutting plane of the touch screen panel. The position detecting lines 122 and the first pads 125 disposed in the touch screen panel area DA are remained.

In the present exemplary embodiment, the second pad 129 is spaced apart from an adjacent second pad 129 by more than 180 µm. Therefore, a property test for the sensing patterns 130 and 140 through the second pad 129 may be possible.

FIG. 10 is a flowchart illustrating an array test method of the mother substrate for touch screen panel according to an exemplary embodiment of the present inventive concept.

Referring to FIGS. 7 and 10, an array test method of the mother substrate for touch screen panel according to an exemplary embodiment of the present inventive concept includes loading a mother substrate for touch screen panel S100, applying a test signal to a pad of the mother substrate for touch screen panel S110, performing an array test S120, finishing an array test S130 and cutting the mother substrate for touch screen panel S140.

The mother substrate for touch screen panel is loaded on an array test process apparatus (Not shown) S100.

An array test for the mother substrate is performed through pads of the mother substrate. When the property test for the mother substrate is performed through the pads of the mother substrate, a test jig may be used. The array test is performed by probing the tips in the test jig to the pads of the mother substrate. Therefore, in order to perform the array test, a width between the pads of the mother substrate must be maintained to have the same width of the tips in the test jig.

In order to perform array test by using the test jig, the width between the pads of the mother substrate must be more than 180 um. When the width between the pads of the mother substrate is less than 180 um, an array test by using the test jig may be impossible.

In the present exemplary embodiment, the first pad 125 is spaced apart from an adjacent first pad 125 by 100 um. Therefore, a property test through the first pad 125 is impossible. However, the second pad 129 is spaced apart from an adjacent second pad 129 by more than 180 µm. Therefore, a property test for the sensing patterns 130 and 140 through the second pad 129 may be possible.

A test signal is applied to the mother substrate for touch screen panel S110. The test signal by the sensing patterns 130 and 140 is transferred to the second pads 129 through the position detecting lines 122, the first pads 125 and the connection line 127.

An array test is performed by using the test signal S120. The array test is performed by probing the tips in the test jig to the pads of the mother substrate. After all the second pads 129 are tested, the array test is finished S130.

After the array test is finished, the mother substrate 1000 for touch screen panel is cut along the cutting line CL S140.

The non-active area of the mother substrate 1000 for touch screen panel may be divided into two regions by a cutting line CL. The non-active area may include a touch screen panel area DA disposed inside of the cutting line and a peripheral area PA disposed outside of the cutting line.

The position detecting lines 122 and the first pads 125 may be disposed in the touch screen panel area DA. The connection lines 127 and the second pads 129 may be disposed in the peripheral area PA.

After the array test is finished, the mother substrate 1000 for touch screen panel is cut along the cutting line CL. Thus, the peripheral area PA of the mother substrate 1000 for touch screen panel is removed. The touch screen panel area DA of the mother substrate 1000 for touch screen panel is remained. Accordingly, the connection line 127 and the second pads 129 disposed in the peripheral area PA are removed. The position detecting lines 122 and the first pads 125 disposed in the touch screen panel area DA are remained. The cutting line CL may be formed to cross the connection line 127. Thus, the touch screen panel may have an exposed portion of a first pad forming material or a connection line forming material on a cutting plane of the touch screen panel. A distance between the exposed portions of a first pad forming material in a center is greater than a distance between the exposed portions of a first pad forming material in an edge.

According to the present exemplary embodiment, a mother substrate for touch screen panel includes first pads arranged densely and second pads having pan-out portion which extends from the first pads. A width between the first pads is less than 100 µm. A width between the second pads is more than 180 µm. When a width between the pads is less than 180 µm, an array test is impossible. However, a width between the second pads is more than 180 µm. Therefore, an array test through the second pads may be possible.

In addition, the second pads are removed after the array test is finished. Therefore, loss of a space of the touch screen panel may be decreased.

The foregoing is illustrative of the present inventive concept and is not to be construed as limiting the scope of the inventive concept. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A mother substrate for touch screen panel comprising:
a plurality of sensing patterns disposed in an active area;
a plurality of first pads disposed in a non-active area surrounding the active area, the first pads being spaced apart from each other by a first width;

a plurality of position detecting lines disposed in the non-active area and connecting the sensing patterns and the first pads; and a plurality of second pads connected to the first pads, the second pads being spaced apart from each other by a second width more than the first width and disposed further away from the active area than the plurality of first pads.

2. The mother substrate for touch screen panel of claim 1, further comprising:

a plurality of connection lines disposed in the non-active area and connecting the first pads and the second pads.

3. The mother substrate for touch screen panel of claim 2, wherein each of the connection lines comprise:

a first end connected to one of the first pads; and a second end connected to one of the second pads, wherein the connection lines have fan-out portion.

4. The mother substrate for touch screen panel of claim 2, wherein the non-active area is divided into two areas by a cutting line surrounding the active area, wherein the non-active area comprises:

a touch screen panel area disposed inside of the cutting line; and a peripheral area disposed outside of the cutting line, wherein the first pads and the position detecting lines are disposed in the touch screen panel area, and wherein the second pads and the connection lines are disposed in the peripheral area.

5. The mother substrate for touch screen panel of claim 1, wherein the first width is less than about 100 um.

6. The mother substrate for touch screen panel of claim 1, wherein the second width is more than about 180 um.

7. The mother substrate for touch screen panel of claim 1, wherein the first pads and the second pads are formed of the same material.

8. A touch screen panel having a side surface connecting a top surface and a bottom surface, the bottom surface facing the top surface, the touch screen panel comprising:

a plurality of sensing patterns disposed in an active area on the top surface;

a plurality of first pads disposed on the top surface in a non-active area surrounding the active area, the first pads being spaced apart from each other by a first width;

a plurality of position detecting lines disposed in the non-active area and connecting the sensing patterns and the first pads, wherein the touch screen panel have an exposed portion of a first pad forming material on the side surface.

9. The touch screen panel of claim 8, wherein a distance between the exposed portions of a first pad forming material is larger than the first width.

10. The touch screen panel of claim 8, further comprising a fanout portion connected to the plurality of first pads and extending toward the cutting plane.

11. The touch screen panel of claim 10, wherein a distance between the exposed portions of a first pad forming material is larger than the first width.

12. The touch screen panel of claim 11, wherein a distance between exposed portions of a first pad forming material in a center is greater than a distance between exposed portions of a first pad forming material in an edge.

13. A method of forming a touch screen panel which comprises a plurality of sensing patterns disposed in an active area, a plurality of first pads disposed in an non-active area surrounding the active area, a plurality of position detecting lines disposed in the non-active area and connecting the sensing patterns and the first pads, and a plurality of second pads connected to the plurality of first pads and disposed further away from the active area than the plurality of first pads, the method comprising:

applying a test signal to the sensing patterns;

detecting the test signal from the second pads; and cutting the mother substrate for touch screen panel along a cutting line formed in the non-active area, the cutting line being disposed between the plurality of first pads and the plurality of second pads, and wherein the first pads are spaced apart from each other by a first width, and the second pads are spaced apart from each other by a second width more than the first width.

14. The method of claim 13, further comprising:

a plurality of connection lines disposed in the non-active area and connected between the first pads and the second pads.

15. The method of claim 14, wherein each of the connection lines comprises:

a first end connected to one of the first pads; and a second end connected to one of the second pads, wherein a distance between two adjacent second ends is more than a distance between two adjacent first ends.

16. The method of claim 14, wherein the non-active area is divided as two areas by a cutting line surrounding the active area, wherein the non-active area comprises:

a touch screen panel area disposed inside of the cutting line; and a peripheral area disposed outside of the cutting line.

17. The method of claim 16, wherein the first pads and the position detecting lines are disposed in the touch screen panel area.

18. The method of claim 16, wherein the second pads and the connection lines are disposed in the peripheral area.

19. The method of claim 13, wherein the second width is more than about 180 m.

20. The method of claim 13, wherein the first pads and the second pads are formed of the same material.

* * * * *